(12) United States Patent
Ono

(10) Patent No.: US 9,401,870 B2
(45) Date of Patent: Jul. 26, 2016

(54) INFORMATION PROCESSING SYSTEM AND METHOD FOR CONTROLLING INFORMATION PROCESSING SYSTEM

(71) Applicant: FUJITSU LIMITED, Kawasaki-shi, Kanagawa (JP)

(72) Inventor: Takatsugu Ono, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 231 days.

(21) Appl. No.: 13/975,569

(22) Filed: Aug. 26, 2013

(65) Prior Publication Data

US 2014/0129718 A1 May 8, 2014

(30) Foreign Application Priority Data

Nov. 7, 2012 (JP) ................. 2012-245599

(51) Int. Cl.
*G06F 15/173* (2006.01)
*H04L 12/917* (2013.01)
*H04L 12/803* (2013.01)

(52) U.S. Cl.
CPC ............. *H04L 47/76* (2013.01); *H04L 47/125* (2013.01)

(58) Field of Classification Search
CPC . G06F 11/0727; G06F 11/079; G06F 3/0605; G06F 3/0665; G06F 3/067
See application file for complete search history.

(56) References Cited

U.S. PATENT DOCUMENTS

| | | | |
|---|---|---|---|
| 5,727,182 A | 3/1998 | Fukushima et al. | |
| 2003/0172163 A1* | 9/2003 | Fujita et al. | 709/226 |
| 2005/0267888 A1 | 12/2005 | Kan et al. | |
| 2005/0278387 A1 | 12/2005 | Kamada et al. | |
| 2006/0129877 A1* | 6/2006 | Yamamoto et al. | 714/6 |
| 2009/0132543 A1* | 5/2009 | Chatley et al. | 707/10 |
| 2011/0283150 A1* | 11/2011 | Konishi et al. | 714/42 |

FOREIGN PATENT DOCUMENTS

| | | |
|---|---|---|
| JP | 8-305629 | 11/1996 |
| JP | 2004-530972 | 10/2004 |
| JP | 2005-339079 | 12/2005 |

(Continued)

OTHER PUBLICATIONS

Patent Abstracts of Japan, Publication No. 08-305629, Published Nov. 22, 1996.

(Continued)

*Primary Examiner* — Umar Cheema
*Assistant Examiner* — Gregory P Tolchinsky
(74) *Attorney, Agent, or Firm* — Staas & Halsey LLP

(57) ABSTRACT

An information processing system includes plural information processing apparatuses, plural storage devices, a load-balancing control device, and an allocation control device. Each of the plural storage devices is allocated to one of the plural information processing apparatuses. The load-balancing control device is configured to receive an access request, and issue an instruction for performing processing based on the received access request to one of the plural information processing apparatuses. The allocation control device is configured to reallocate, when a failure occurs in a first apparatus of the plural information processing apparatuses, first storage devices to a proper substitute apparatus among the plural information processing apparatuses. The first storage devices have been allocated to the first apparatus. The proper substitute apparatus is different from the first apparatus.

6 Claims, 12 Drawing Sheets

500

| | HASHED ACCESS TARGET | SWITCHED ACCESS TARGET | |
|---|---|---|---|
| 510 | S0 | S0 | 511 |
| 520 | S1 | S2 | 521 |
| | S2 | S2 | |
| | ... | ... | |

(56) References Cited

FOREIGN PATENT DOCUMENTS

| JP | 2005-339236 | 12/2005 |
| JP | 2006-127123 | 5/2006 |
| WO | 02/069162 A1 | 9/2002 |

OTHER PUBLICATIONS

Patent Abstracts of Japan, Publication No. 2005-339236, Published Dec. 8, 2005.

Patent Abstracts of Japan, Publication No. 2006-127123, Published May 18, 2006.

Espacenet English Abstract of Japanese Publication No. 2005-339079, published Dec. 8, 2005.

Japanese Office Action dated Apr. 19, 2016 in corresponding Japanese Patent Application No. 2012-245599.

* cited by examiner

| NODE ID | MEMORY ID | QUERY NAMES | | | | | | ACCESS COUNT | TIME COUNTER |
|---|---|---|---|---|---|---|---|---|---|
| S0 | D0 | A | B | C | | | | 8 | 100 |
| | D1 | | D | | E | F | | 3 | 120 |
| | D2 | G | H | I | | | | 5 | 100 |
| S1 | D3 | J | K | L | | | | 6 | 110 |
| | D4 | M | N | | | | | 3 | 100 |
| | D5 | | | | | | | 7 | 100 |
| S2 | D6 | O | | P | Q | | | 2 | 120 |
| | D7 | R | S | | | | | 5 | 100 |
| | D8 | T | U | V | | | | 1 | 90 |
| UNALLOCATED | D9 | | | | | | | 0 | – |

INFORMATION PROCESSING SYSTEM AND METHOD FOR CONTROLLING INFORMATION PROCESSING SYSTEM

CROSS-REFERENCE TO RELATED APPLICATION

This application is based upon and claims the benefit of priority from the prior Japanese Patent Application No. 2012-245599 filed on Nov. 7, 2012, the entire contents of which are incorporated herein by reference.

FIELD

The embodiments discussed herein are related to an information processing system and a method for controlling an information processing system.

BACKGROUND

In an information processing system, for example, a database in which data such as files and images is stored, load involved in accesses may be balanced through parallel arrangement of information processing apparatuses such as servers. Hereinafter, information processing apparatuses that are load balanced may be referred to as "nodes". In such an information processing system, when accesses are concentrated on a particular node, the node on which the accesses are concentrated becomes a bottleneck and thus the overall performance of the information processing system declines.

Accordingly, in order to balance the load on the nodes, there is a related technique in which, among data areas provided in association with the respective nodes, a data area having a high frequency of reference is set as a shared data area that is accessible from another node.

In order to improve the efficiency of search by reducing accesses to a database, there is a related technique in which a search result is obtained from a database server and a page identifier (ID), search condition data, and obtained result data are managed in association with each other.

In addition, there is a proposed technique in which an item of an inquiry to a database server and a result thereof are stored in a memory included in each node, such as a server.

Japanese Laid-open Patent Publication No. 2005-339236 and Japanese Laid-open Patent Publication No. 2006-127123 disclose related techniques.

When an item of an inquiry and a result thereof are to be stored in the memory in each node as in the proposed technique, a load balancer that distributes the inquiry to each node determines in which node the item of the inquiry and the result thereof are to be stored in its memory. For determining in which node the information is to be stored, the load balancer uses a hash table in many cases. For such load balancing, it is conceivable to employ a distribution algorithm for balancing information storage locations, in which the node having an ID represented by a remainder resulting from division of a hash value by the number of load-balanced nodes is set as an information storage location.

However, when any of the load-balanced nodes is removed from the load-balanced configuration because of a failure or the like, the number of nodes decreases. When the number of nodes is used to determine an information storage location, a decrease in the number of nodes causes a value determined as the information storage location to vary. This makes it difficult to connect to the node in which information requested is stored, which may result in frequent occurrence of cache misses. The frequent occurrence of cache misses may cause accesses to concentrate on a database, which may lead to a significant decline in the performance of the information processing system.

In order to alleviate the problems, it is conceivable to employ consistent hashing for limiting influences of the decreased number of nodes to only a portion. Even with such an approach, however, the influences reach multiple nodes in practice, and there is still a possibility that the performance of the information processing system declines.

In the related technique in which the data area having a high frequency of reference is set as the shared data area, no consideration has been given to allocating the memory in each node as an information storage location. Thus, under the above-described situation, it is difficult to avoid the decline in the performance of the information processing system.

In the related technique in which the page ID, the search condition data, and the obtained result data are managed in association with each other, no consideration has been given to node removal when the above-described distribution algorithm is used. Thus, when node removal is performed, it is difficult to avoid the decline in the performance of the information processing system.

SUMMARY

According to an aspect of the present invention, provided is an information processing system including plural information processing apparatuses, plural storage devices, a load-balancing control device, and an allocation control device. Each of the plural storage devices is allocated to one of the plural information processing apparatuses. The load-balancing control device is configured to receive an access request, and issue an instruction for performing processing based on the received access request to one of the plural information processing apparatuses. The allocation control device is configured to reallocate, when a failure occurs in a first apparatus of the plural information processing apparatuses, first storage devices to a proper substitute apparatus among the plural information processing apparatuses. The first storage devices have been allocated to the first apparatus. The proper substitute apparatus is different from the first apparatus.

The objects and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a diagram illustrating a system configuration of an information processing system according to a first embodiment;

FIG. 2 is a block diagram illustrating an information processing system according to a first embodiment;

FIG. 3 illustrates an example of a node conversion table;

FIG. 4 illustrates an example of a management table;

FIG. 5 illustrates an example of a management table after storage units are reallocated;

FIG. 6 is a flowchart illustrating a flow of processing performed in an information processing system according to a first embodiment in response to an access request;

FIG. 7 is a flowchart illustrating a flow of processing for determining a cache node to be accessed;

DESCRIPTION OF EMBODIMENTS

Embodiments of an information processing system and a method for controlling an information processing system will be described below in detail with reference to the accompanying drawings. The embodiments described below are not intended to limit the embodiments of the information processing system and the method for controlling the information processing system.

First Embodiment

Figure 1:
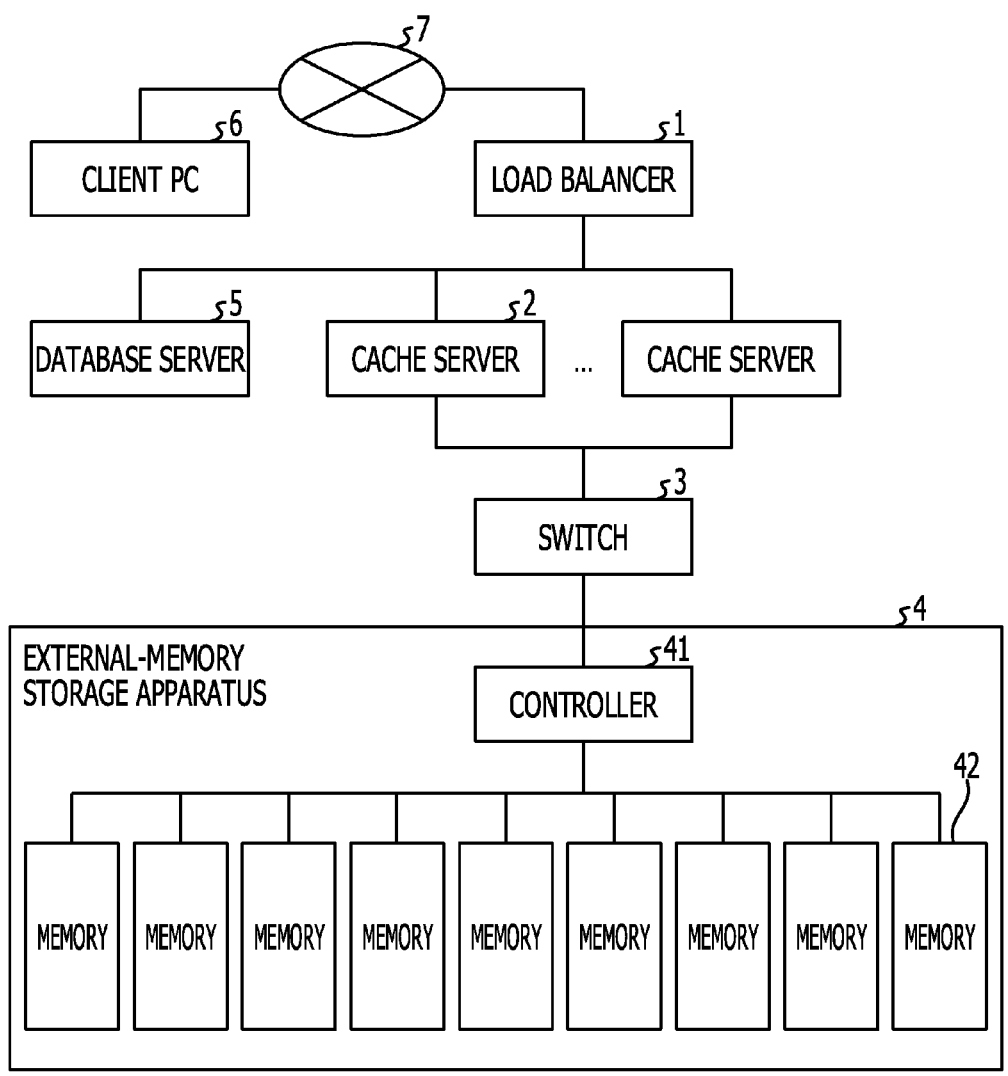

FIG. 1 is a diagram illustrating a system configuration of an information processing system according to a first embodiment. As illustrated in FIG. 1, the information processing system according to the present embodiment includes a load balancer 1, cache servers 2, a switch 3, an external-memory storage apparatus 4, a database server 5, a client personal computer (PC) 6, and a network 7.

The database server 5 has a database. When no cache hit occurs in the cache servers 2, the database server 5 receives an access request, such as a write request or a read request. The access request includes a query for write or read instruction. The query includes a key (referred to as a query key) for identifying data requested. When the received access request is a read request, the database server 5 searches the database to extract data specified by the query. The database server 5 then returns the extracted data to the request source. When the received access request is a write request, the database server 5 writes the specified data to the database and returns a response indicating that the processing is completed to the request source.

The client PC 6 transmits an access request to the load balancer 1 through the network 7. The client PC 6 then obtains, from the load balancer 1, a response to the query included in the access request. For example, when the access request is a read request, the client PC 6 obtains the data, which is specified to be read, from the load balancer 1.

The load balancer 1 receives the access request from the client PC 6. The load balancer 1 then outputs a query corresponding to the received access request to the database server 5 or any of the cache servers 2. More specifically, the load balancer 1 calculates a value uniquely indicating any of the cache servers 2 by applying a hash function or the like to the query in the received access request. The load balancer 1 then transmits the query to the cache server 2 corresponding to the calculated value. When the cache server 2 corresponding to the calculated value already manages corresponding data, the load balancer 1 receives a cache hit notification from the cache server 2. In contrast, when the cache server 2 corresponding to the calculated value does not manage corresponding data, the load balancer 1 receives a cache miss notification from the cache server 2. The load balancer 1 then reads the specified data from the database server 5. Next, the load balancer 1 transmits the read data to the cache server 2 corresponding to the calculated value. The cache server 2 receives the data and stores the received data in free space in an internal memory (not illustrated) built into the cache server 2 or one of memories 42, which is managed by the cache server 2, included in the external-memory storage apparatus 4. When there is no free space in any of the internal memory and the memory 42 managed by the cache server 2, the cache server 2 deletes data in the internal memory by using a least recently used (LRU) scheme or the like and stores the received data in the created free space.

The cache server 2 receives, from the load balancer 1, a query corresponding to an access request. The cache server 2 checks whether or not data specified by the query is stored in the internal memory. When the specified data is stored in the internal memory, the cache server 2 transmits a cache hit notification to the load balancer 1. In addition, when the access request is a read request, the cache server 2 outputs the hit data to the load balancer 1. In contrast, when the specified data is not stored in the internal memory, the cache server 2 outputs the query corresponding to the access request to the external-memory storage apparatus 4 via the switch 3. When a cache hit occurs in the external-memory storage apparatus 4, the cache server 2 transmits a cache hit notification to the load balancer 1. In addition, when the access request is a read request, the cache server 2 receives, from the external-memory storage apparatus 4 via the switch 3, data corresponding to the read request. The cache server 2 then outputs the received data corresponding to the read request to the client PC 6 via the load balancer 1. When a cache miss occurs in the external-memory storage apparatus 4, the cache server 2 transmits a cache miss notification to the load balancer 1.

After a cache miss occurs, the cache server 2 receives, from the load balancer 1, a write request for writing cache-missed data to a cache memory, which is the internal memory or the memory 42 managed by the cache server 2. Upon receiving the write request, the cache server 2 determines whether or not there is free space in the internal memory. When there is free space in the internal memory, the cache server 2 writes the specified data to the internal memory. On the other hand, when there is no free space in the internal memory, the cache server 2 transmits the query corresponding to the write request to the external-memory storage apparatus 4 via the switch 3.

The switch 3 may be a switch that employs, for example, multi root input output virtualization (MR-IOV). The switch 3 transfers a query or the like, transmitted from the cache server 2, to the external-memory storage apparatus 4.

The external-memory storage apparatus 4 includes a controller 41 and the memories 42. Although nine memories 42 are illustrated in FIG. 1, the number of memories 42 is not particularly limited.

The controller 41 has a management table containing information about the memories 42 managed by the respective cache servers 2 and information about queries corresponding to data stored in the memories 42.

Upon receiving the query corresponding to the access request from the cache server 2, the controller 41 uses the management table to identify memories 42 associated with the cache server 2 that is the transmission source of the query and extract a memory 42 likely to store data corresponding to the query. In addition, the controller 41 determines whether or not the data corresponding to the query is stored in the extracted memory 42. When the data corresponding to the query is not stored in the extracted memory 42, the controller 41 returns a cache miss notification to the cache server 2. In contrast, when the data corresponding to the query is stored, the controller 41 returns a cache hit notification to the cache server 2. In addition, when the query is a query (hereinafter, referred to as a read query) for read instruction, the controller 41 retrieves the data corresponding to the query from the extracted memory 42. The controller 41 then outputs, via the switch 3, the retrieved data to the cache server 2 that is the transmission source of the query.

Upon receiving a write request from the cache server 2 after a cache miss occurs, the controller 41 uses the management table to identify the memory 42 allocated to the cache server 2 that is the transmission source of the write request. The controller 41 then writes data corresponding to the write request to the identified memory 42. The controller 41 then registers, in the management table, an association between the query name of the query corresponding to the data and the memory 42 in which the data is stored.

Figure 2:
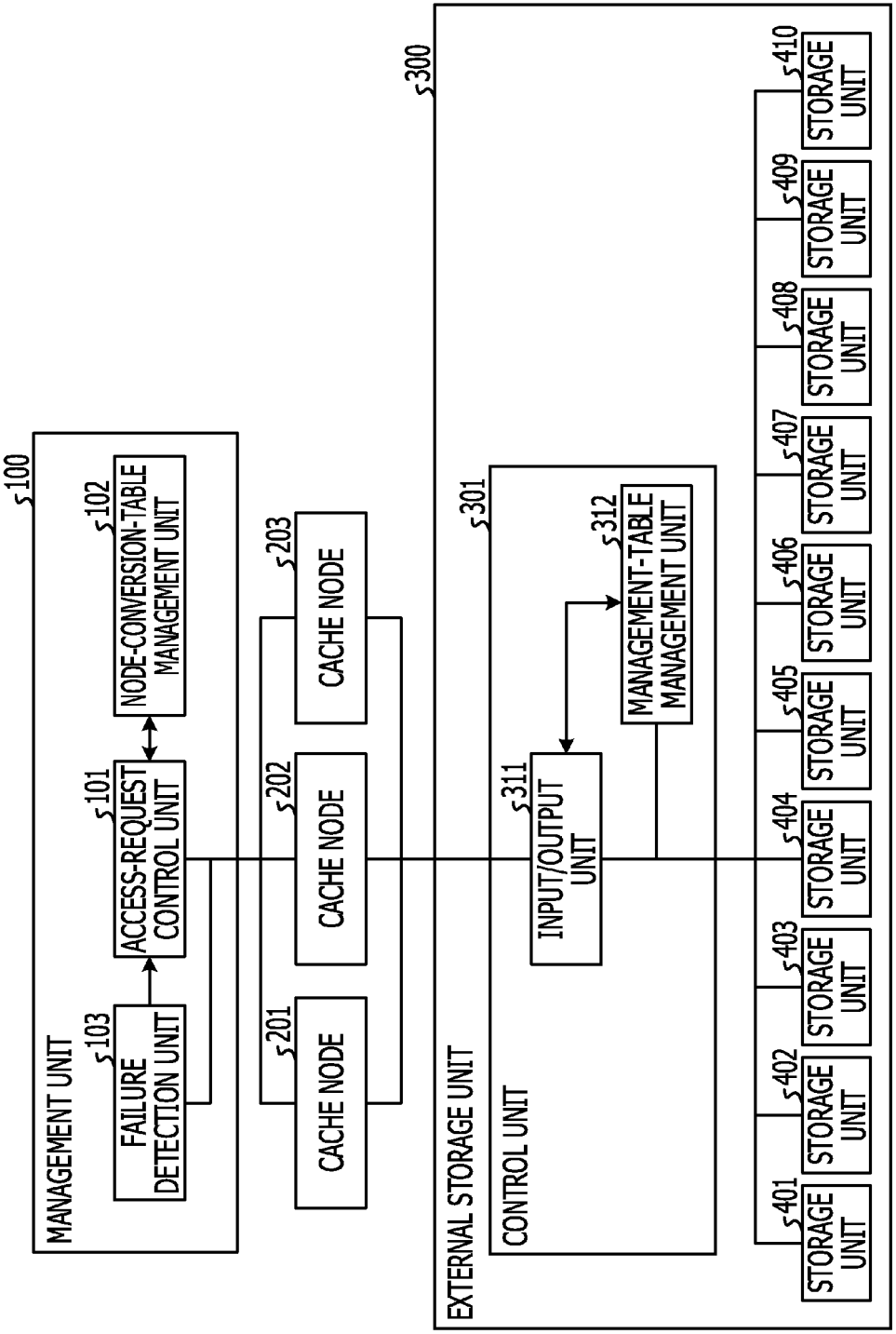

Next, functions and operations when a failure occurs in a cache server in an information processing system according to the present embodiment will be described in detail with reference to FIG. 2. FIG. 2 is a block diagram illustrating an information processing system according to the first embodiment.

As illustrated in FIG. 2, the information processing system according to the present embodiment includes a management unit 100, cache nodes 201 to 203, and an external storage unit 300. The management unit 100 corresponds to the load balancer 1 illustrated in FIG. 1. The cache nodes 201 to 203 correspond to the cache servers 2 illustrated in FIG. 1. Hereinafter, the cache nodes 201 to 203 may simply be referred to as "cache nodes 200", unless they are distinguished from one another.

The external storage unit 300 includes a control unit 301 and storage units 401 to 410. The control unit 301 corresponds to the controller 41 illustrated in FIG. 1. The storage units 401 to 410 correspond to the memories 42 illustrated in FIG. 1. Hereinafter, the storage units 401 to 410 may simply be referred to as "storage units 400", unless they are distinguished from one another. Although a function corresponding to the switch 3 in FIG. 1 is not illustrated in FIG. 2 for convenience of description, a processing unit that realizes a switching function implemented by the switch 3 is, in practice, provided between the cache nodes 201 to 203 and the control unit 301. The database server 5, the client PC 6, and the network 7 illustrated in FIG. 1 are also not illustrated in FIG. 2, in order to mainly describe operations upon failure of a cache node 200.

The management unit 100 includes an access-request control unit 101, a node-conversion-table management unit 102, and a failure detection unit 103. The management unit 100 corresponds to an example of a "load-balancing control device".

Figure 3:
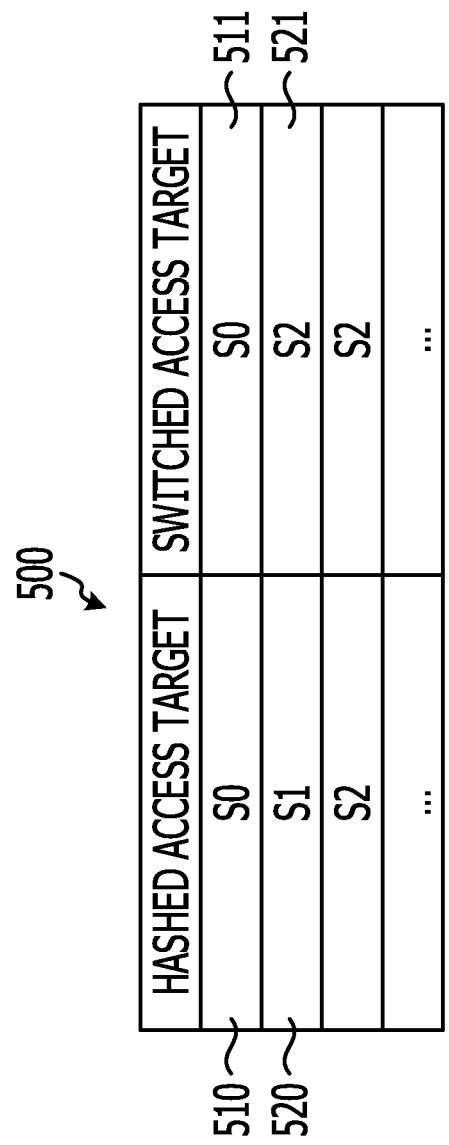

The node-conversion-table management unit 102 stores therein, for example, a node conversion table 500 as illustrated in FIG. 3. FIG. 3 illustrates an example of a node conversion table. The node conversion table 500 indicates that a failure occurred in one cache node 200 and then the storage units 400 managed by the cache node 200, in which the failure occurred, have been brought under the management of another cache node 200. As illustrated in FIG. 3, an access target (hereinafter referred to as a "hashed access target" which is described below) after hashing is registered in the node conversion table 500 in association with a switched access target (described later) corresponding thereto. Each hashed access target corresponds to an identifier of the cache node 200 to which data is to be written or from which data is to be read by an access request. Specifically, each hashed access target is represented by, for example, a value calculated by applying an algorithm, such as a hash function, to the query included in the access request. More specifically, the value is calculated, for example, by determining a hash value by applying a hash function to the query (key) and dividing the hash value by the number of cache nodes 200. Hereinafter, the identifiers of the cache nodes 200 may be referred to as "node IDs". Also, "S0" illustrated in FIG. 3 corresponds to the node ID of the cache node 201, "S1" corresponds to the node ID of the cache node 202, and "S2" corresponds to the node ID of the cache node 203. The node conversion table 500 corresponds to an example of a "conversion table".

The access-request control unit 101 receives an access request from the client PC 6. The access-request control unit 101 calculates a value, for example, by applying an algorithm, such as a hash function, to the query included in the received access request. The access-request control unit 101 then obtains, from the node conversion table 500 managed by the node-conversion-table management unit 102, the node ID indicating the switched access target associated with the cache node 200 having the node ID indicated by the calculated value, which indicates the hashed access target. The access-request control unit 101 then outputs the query to the cache node 200 corresponding to the obtained node ID. Hereinafter, the cache node 200 that is the transmission destination of the query may be referred to as an "access target".

For example, as illustrated in FIG. 3, a hashed access target 510 is "S0" indicating the cache node 201. A switched access target 511 associated with the hashed access target 510 is "S0" indicating the cache node 201. Thus, it may be said that no node switching has occurred to the cache node 201. In this case, when the value of the hashed access target determined from the access request is "S0", the access-request control unit 101 obtains "S0" as the value of the switched access target and sets the cache node 201 corresponding to "S0" as an output target of the access request. When the value of the hashed access target and the value of the switched access target match each other, the access-request control unit 101 may set the cache node 201 corresponding to the hashed access target as an output target of the query, without obtaining the information about the switched access target.

As illustrated in FIG. 3, a hashed access target 520 is "S1" indicating the cache node 202. A switched access target 521 associated with the hashed access target 520 is "S2" indicating the cache node 203. In this case, when the value of the hashed access target determined from the access request is "S1", the access-request control unit 101 obtains "S2" as the value of the switched access target. The access-request control unit 101 then outputs the query in the received access request to the cache node 203 corresponding to "S2".

The access-request control unit 101 also receives, from the cache node 200, a response corresponding to the query included in the access request. The access-request control unit 101 then outputs the received response.

The access-request control unit 101 receives a notification of a failure in a cache node 200 from the failure detection unit 103. Then, the access-request control unit 101 selects a tentative substitute node from cache nodes 200, which have not failed, of the cache nodes 201 to 203. For example, the access-request control unit 101 randomly selects the tentative substitute node from the cache nodes 200 that have not failed. The access-request control unit 101 then notifies the cache node 200 selected as the tentative substitute node that it is selected as the tentative substitute node. Thereafter, the access-request control unit 101 receives, from a cache node 200 determined as a proper substitute node by the cache node 200 selected as the tentative substitute node, a notification indicating that update (described below) of the management table is completed. The access-request control unit 101 then registers, in the node conversion table 500, the node ID of the cache node 200 determined as the proper substitute node, as the switched access target associated with the failed cache node 200 that is the hashed access target.

The failure detection unit 103 monitors operations of the cache nodes 200. When a failure occurs in any of the cache nodes 200, the failure detection unit 103 detects the occurrence of the failure. Upon detecting the occurrence of the failure, the failure detection unit 103 outputs, to the access-request control unit 101, the identification information of the cache node 200 in which the failure occurred.

As described above, in the information processing system according to the present embodiment, when a cache node 200 managing storage units 400 is switched due to a failure in the cache node 200 to another cache node 200, the switched access target associated with the hashed access target indicating the failed cache node 200 is rewritten in the node conversion table 500. As a result, in the information processing system according to the present embodiment, data stored in the storage units 400 that were managed by the failed cache node 200 may be accessed via the cache node 200 to which the storage units 400 that were managed by the failed cache node 200 is reallocated.

The cache node 200 receives a query from the access-request control unit 101. The cache node 200 corresponds to an example of an "information processing apparatus".

The cache node 200 determines whether or not data specified by the query is stored in the internal memory built into the cache node 200. When the data is stored in the internal memory, the cache node 200 issues a cache hit notification to the access-request control unit 101. In addition, when the query is a read query, the cache node 200 retrieves the specified data from the internal memory and transmits the retrieved data to the access-request control unit 101 in the management unit 100. In contrast, when the data specified by the query is not stored in the internal memory, the cache node 200 transmits the query to the control unit 301. Thereafter, upon receiving a cache hit notification from the control unit 301, the cache node 200 transmits the cache hit notification to the access-request control unit 101. In addition, when the query is a read query, the cache node 200 receives, from the control unit 301, the data corresponding to the read query. The cache node 200 then transmits the received data to the access-request control unit 101 in the management unit 100. In contrast, when the data corresponding to the read query is not stored, that is, when a cache miss notification is received from the control unit 301, the cache node 200 transmits the cache miss notification to the access-request control unit 101. Thereafter, the cache node 200 receives, from the access-request control unit 101, a write request for the cache missed data.

Upon receiving the write request for the cache missed data, the cache node 200 determines whether or not there is free space in the internal memory built into the cache node 200. When there is free space in the internal memory, the cache node 200 writes the specified data to the internal memory. In contrast, when there is no free space in the internal memory, the cache node 200 checks with the control unit 301 as to whether or not there is free space in the storage units 400 managed by the cache node 200. Thereafter, upon receiving a notification indicating that there is free space from the control unit 301, the cache node 200 transmits the write request to the control unit 301. In contrast, upon receiving a notification indicating that there is no free space from the control unit 301, the cache node 200 deletes data in the internal memory therein in accordance with the LRU scheme or the like. The cache node 200 then writes the data specified by the write request to the free space created in the internal memory.

The cache node 200 selected as the tentative substitute node by the access-request control unit 101 receives, from the access-request control unit 101, a notification indicating that the cache node 200 is selected as the tentative substitute node. The cache node 200 selected as the tentative substitute node then retrieves, from the control unit 301, access counts (described later) of the respective storage units 400. In addition, the cache node 200 selected as the tentative substitute node obtains information about cache nodes 200 to which the respective storage units 400 are allocated. Thereafter, the cache node 200 selected as the tentative substitute node calculates the total of the access counts of the storage units 400 allocated to each cache node 200 that has not failed. The cache node 200 selected as the tentative substitute node then identifies a cache node 200 whose access counts of the storage units 400 allocated thereto is the smallest. The cache node 200 selected as the tentative substitute node then determines the identified cache node 200 as a proper substitute node. Thereafter, the cache node 200 selected as the tentative substitute node reports, to the control unit 301, the identification information of the cache node 200 determined as the proper substitute node. In this case, the cache node 200 selected as the tentative substitute node may be determined as the proper substitute node.

The cache node 200 determined as the proper substitute node by the cache node 200 selected as the tentative substitute node receives, from the control unit 301, a notification for updating a node management table (described below). The cache node 200 determined as the proper substitute node then issues the notification for updating the node management table to the access-request control unit 101 in the management unit 100 in conjunction with the identification information of the cache node 200 determined as the proper substitute node.

The control unit 301 includes an input/output unit 311 and a management-table management unit 312. The control unit 301 corresponds to an example of an "allocation control device".

The management-table management unit 312 stores therein a management table 600 illustrated in FIG. 4. FIG. 4 illustrates an example of a management table. As illustrated in FIG. 4, a memory ID, query names, an access count, and a time counter are registered in the management table 600 in association with a node ID. The memory ID is identification information of a storage unit 400 allocated to a cache node 200 having the corresponding node ID. Here, it is assumed that memory IDs "D0" to "D9" illustrated in FIG. 4 correspond respectively to the storage units 401 to 410 illustrated in FIG. 2. The query names are identification information of queries corresponding to data stored in the corresponding storage unit 400. A "query names" field is sectioned so as to correspond to address spaces in the corresponding storage unit 400. The storage location within the storage unit 400 in which the data corresponding to the query is stored is detected based on the sectioned position of the "query names" field in which the query name is stored. In the example illustrated in FIG. 4, data corresponding to queries having query names A, B, and C, respectively, is stored in the first three blocks in the storage unit 401 having memory ID "D0". Data corresponding to queries having query names D, E, and F are stored in the second, fourth, and fifth blocks, respectively, in the storage unit 402. Each blank area in the query names indicates, for example, a case in which no data has been written or data has been deleted. The access count indicates the number of accesses to the corresponding storage unit 400 in a certain period of time. The time counter indicates the time that has passed from when the corresponding storage unit 400 is allocated to the cache node 200.

When the cache nodes 201 to 203 are started up, the management-table management unit 312 determines which of the storage units 400 are to be allocated to each of the cache nodes 201 to 203. For example, the management-table management unit 312 equally allocates, to each cache node 200, the storage units 400 corresponding to a value obtained by dividing the number of storage units 400 by the number of cache nodes 200 and excluding its remainder. The management-table management unit 312 then registers, in "memory ID" fields in the management table 600, the identification information of the storage units 400 allocated to respective cache nodes 200. The management-table management unit 312 obtains, from the input/output unit 311, the query names of queries corresponding to data stored in each storage unit 400, in conjunction with the memory ID that is the identification information of each storage unit 400 in which the data is stored. The management-table management unit 312 then registers the obtained query names in the "query names" field included in the management table 600 in association with the obtained memory ID. The management-table management unit 312 receives, from the input/output unit 311, a notification indicating that a query corresponding to an access request is received, in conjunction with the memory ID of the storage unit 400 in which the data specified by the query is stored. The management-table management unit 312 increments, in the management table 600, the access count corresponding to the received memory ID by 1. When a predetermined amount of time passes during time measurement using the time counter, the management-table management unit 312 resets the access count in the management table 600 to 0. The management-table management unit 312 also includes a clock (not illustrated), and registers with the time counter as appropriate, the time counted using the clock. When a predetermined period of time passes after data corresponding to a query is stored in the storage unit 400, the management-table management unit 312 deletes the data corresponding to the query from the storage unit 400. In addition, the management-table management unit 312 deletes the corresponding query name from the management table 600.

Figure 5:
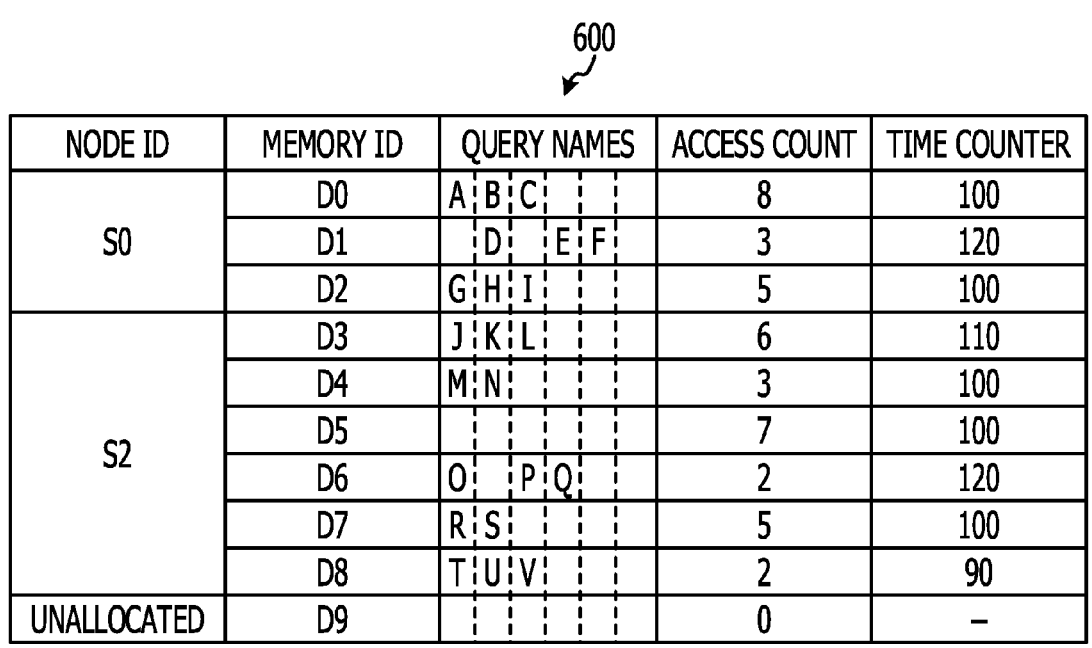

The management-table management unit 312 receives, via the input/output unit 311, information regarding the failed node and the cache node 200 determined as the proper substitute node transmitted from the cache node 200 selected as the tentative substitute node. The management-table management unit 312 then allocates, in the management table 600, the memory IDs, allocated to the node ID of the failed cache node 200, to the cache node 200 determined as the proper substitute node. The management-table management unit 312 then transmits, via the input/output unit 311, a notification indicating that the update of the management table 600 is completed to the cache node 200 determined as the proper substitute node. Rewriting of the management table 600 by the management-table management unit 312 will be specifically described with reference to FIGS. 4 and 5. FIG. 5 illustrates an example of the management table 600 after the storage units 400 are reallocated. It is assumed, when the management table 600 is in a state as illustrated in FIG. 4, that the management-table management unit 312 receives, from the cache node 200 selected as the tentative substitute node, information indicating that the cache node 202 is a failed node and the cache node 203 is a proper substitute node. In this case, the management-table management unit 312 checks that the storage units 400 having memory IDs "D3" to "D5" are allocated to "S1", which is the node ID indicating the failed cache node 202. Next, the management-table management unit 312 deletes "S1", which is the node ID of the failed cache node 202, from the management table 600. In addition, the management-table management unit 312 registers the storage units 400 having memory IDs "D3" to "D5" so that they are associated with the node ID of the cache node 203 determined as the proper substitute node. As a result, the management table 600 changes to the state illustrated in FIG. 5. In FIG. 5, six memory IDs, specifically, "D3" to "D8", are associated with node ID "S2". That is, the storage units 404 to 409 are allocated to the cache node 203.

Upon receiving a query corresponding to an access request from a cache node 200, the input/output unit 311 determines whether or not a query name of the received query is registered in the management table 600 included in the management-table management unit 312. When the query corresponding to the access request is registered, the input/output unit 311 transmits a cache hit notification to the cache node 200. In addition, when the query is a read query, the input/output unit 311 identifies a memory ID corresponding to the query name of the query and the block in which data corresponding to the query is stored. The input/output unit 311 then retrieves data corresponding to the access request from the identified block in the storage unit 400 having the identified memory ID. Thereafter, the input/output unit 311 transmits the retrieved data to the cache node 200 that is the transmission source of the query.

For example, a description will be given of a case in which no failure occurs in any of the cache nodes 200 and the management table 600 is in a state as illustrated in FIG. 4. Upon receiving a read query having query name "M" from the cache node 202, the input/output unit 311 checks that the storage units 400 having memory IDs "D3" to "D5" are allocated to node ID "S1" in the management table 600 illustrated in FIG. 4. The input/output unit 311 then searches the management table 600 for the query names of queries corresponding to data stored in the storage units 400 having memory IDs "D3" to "D5". The input/output unit 311 then determines that data corresponding to the query having query name "M" is stored in the first block in the storage unit 405 having memory ID "D4". The input/output unit 311 then issues a cache hit notification to the cache node 202. In addition, the input/output unit 311 retrieves the data from the first block in the storage unit 405 and outputs the retrieved data to the cache node 202.

Next, a description will be given of a case in which the cache node 202 fails and the management table 600 is put into a state as illustrated in FIG. 5. Upon receiving a read query having query name "M" from the cache node 203, the input/output unit 311 checks that the storage units 400 having memory IDs "D3" to "D8" are allocated to node ID "S2" in the management table 600 illustrated in FIG. 5. The input/output unit 311 then searches the management table 600 for the query names of queries corresponding to data stored in the storage unit 400 having memory IDs "D3" to "D8". The input/output unit 311 then identifies that data corresponding to the query having query name "M" is stored in the first block in the storage unit 405 having memory ID "D4". The input/output unit 311 issues a cache hit notification to the cache node 203. The input/output unit 311 further retrieves the data from the first block in the storage unit 405 and outputs the retrieved data to the cache node 203.

As described above, in the information processing system according to the present embodiment, when a cache node 200 managing storage units 400 is switched due to a failure in the cache node 200 to another cache node 200, the memory IDs associated with the node ID are rewritten in the management table 600. With this arrangement, in the information processing system according to the present embodiment, data stored in the storage units 400 that were managed by the failed cache node 200 may be accessed via the cache node 200 to which the storage units 400 that were managed by the failed cache node 200 are reallocated.

Now, a description will be given with reference back to FIG. 2. When the query name of the read query is not registered in the management table 600, the input/output unit 311 issues a cache miss notification to the cache node 200 that is the transmission source of the access request.

Upon receiving a write request after the cache miss occurs, the input/output unit 311 uses the management table 600 to identify the storage units 400 allocated to the cache node 200 that is the transmission source of the query. The input/output unit 311 then determines whether or not there is free space in any of the identified storage units 400.

When there is free space, the input/output unit 311 writes data specified by the access request to the free space. The input/output unit 311 then reports the memory ID of the storage unit 400 and the block in which the data is written to the management-table management unit 312. In this case, the following scheme is conceivable as a scheme for determining the storage unit 400 to which the data is to be written. For example, the input/output unit 311 obtains the access counts of the respective storage units 400 from the management table 600 and selects the storage units 400 in an ascending order of the access counts thereof. This arrangement makes it possible to reduce conflicts among the storage units 400 for which access requests are to be issued. As an alternative scheme, for example, the input/output unit 311 may obtain the access counts of the respective storage units 400 from the management table 600 and selects the storage units 400 in a descending order of the access counts thereof. Such an arrangement makes it possible to put the storage units 400 whose access counts are small into a low-power consumption mode, thereby making it possible to achieve power saving.

In contrast, when there is no free space in any of the identified storage units 400, the input/output unit 311 issues a notification to that effect to the cache node 200 that is the transmission source of the write request.

The storage units 401 to 410 are storage media, such as memories including dual inline memory modules (DIMMs). Under the control of the input/output unit 311, the storage units 401 to 410 store therein data corresponding to queries.

Figure 6:
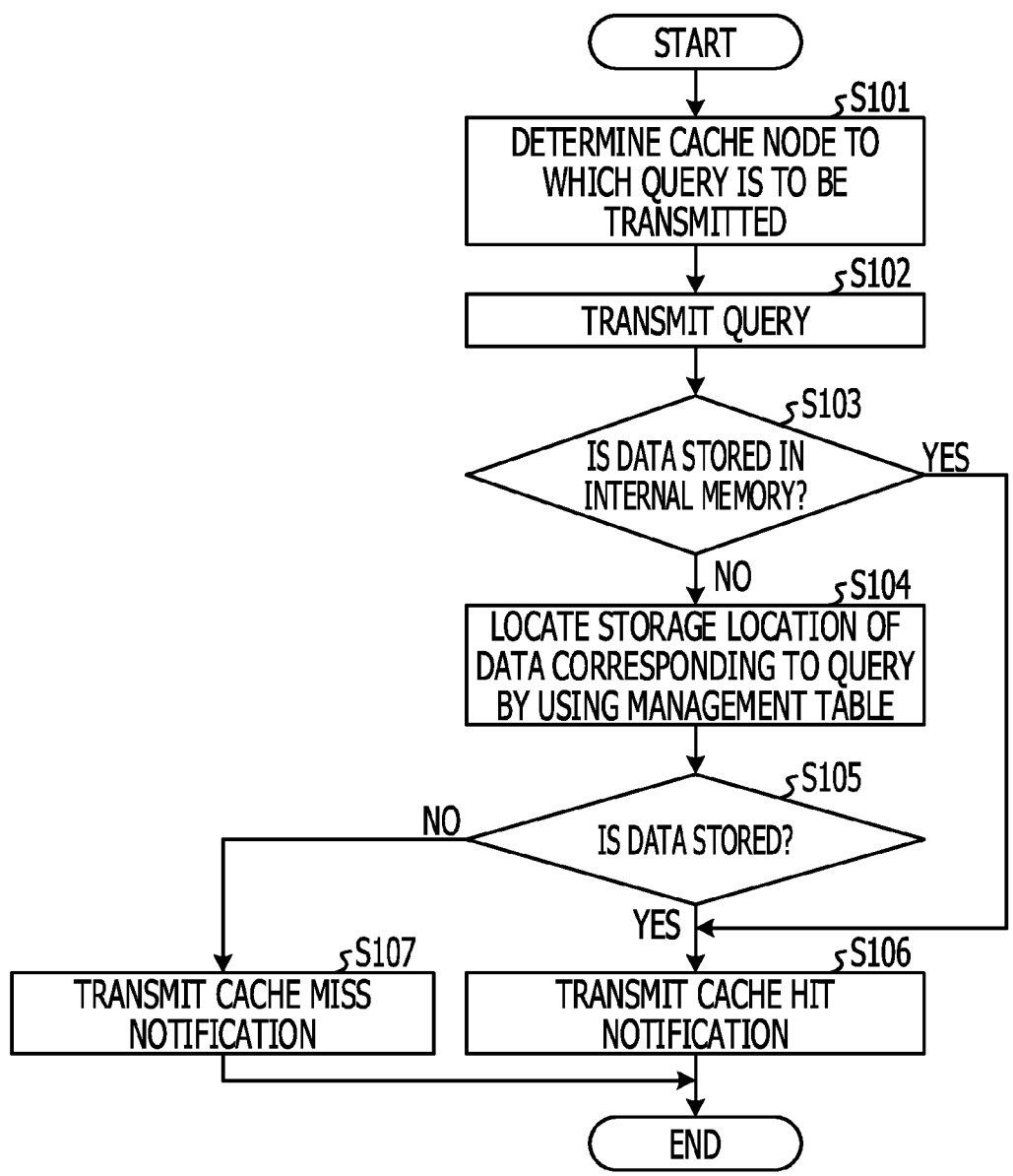

Next, a flow of processing performed in the information processing system according to the first embodiment in response to an access request will be described with reference to FIG. 6.

In S101, the access-request control unit 101 in the management unit 100 receives an access request. The access-request control unit 101 then determines the cache node 200 to which a query corresponding to the received access request is to be transmitted.

In S102, the access-request control unit 101 transmits the query to the determined cache node 200.

In S103, the cache node 200 that has received the query from the access-request control unit 101 determines whether or not requested data corresponding to the query is stored in the internal memory. When the requested data corresponding to the query is stored in the internal memory (Yes in S103), the process proceeds to S106.

In contrast, when the requested data corresponding to the query is not stored in the internal memory (No in S103), in S104, the cache node 200 transmits the query to the input/output unit 311. The input/output unit 311 receives the query from the cache node 200. By using the management table 600 held by the management-table management unit 312, the input/output unit 311 locates the storage location of the data corresponding to the query.

In S105, the input/output unit 311 determines whether or not the data corresponding to the query is stored in the storage unit 400.

When the data corresponding to the query is stored (Yes in S105), in S106, the input/output unit 311 returns a cache hit notification to the cache node 200 that is the transmission source of the query. The cache node 200 transmits a cache hit notification to the access-request control unit 101.

In contrast, when the data corresponding to the query is not stored (No in S105), in S107, the input/output unit 311 returns a cache miss notification to the cache node 200 that is the transmission source of the query. The cache node 200 transmits a cache miss notification to the access-request control unit 101.

Figure 7:
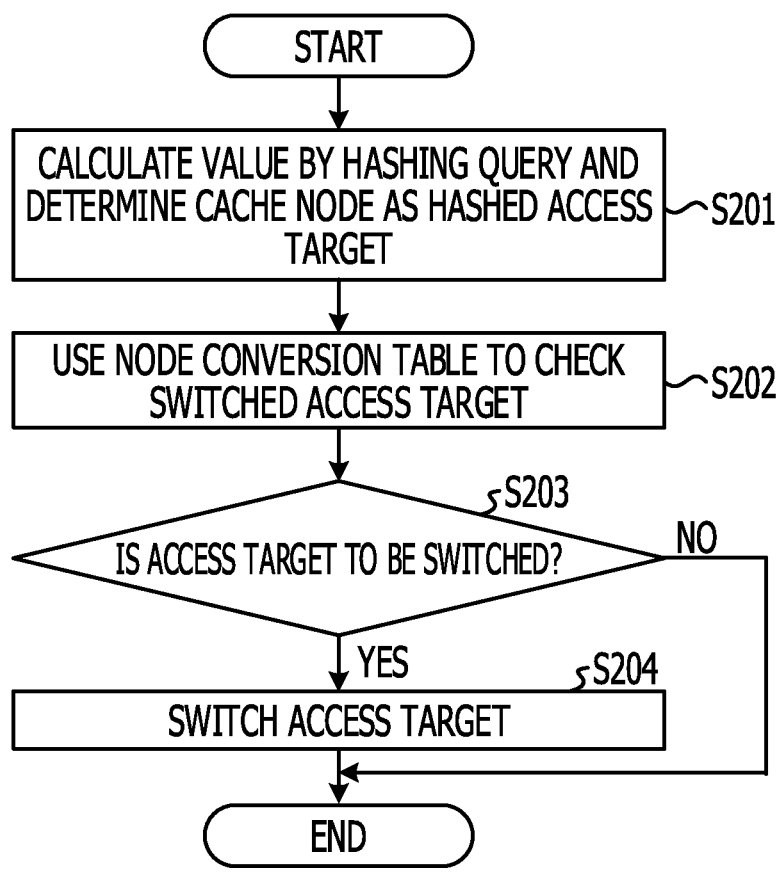

Next, processing for determining a cache node 200 upon reception of an access request will be described in detail with reference to FIG. 7. The flowchart illustrated in FIG. 7 corresponds to S101 illustrated in FIG. 6.

In S201, the access-request control unit 101 calculates a value, for example, by determining a hash value by applying a hash function to the query corresponding to the received access request and dividing the hash value by the number of cache nodes 200. The access-request control unit 101 determines, as the hashed access target, a cache node 200 corresponding to the calculated value.

In S202, the access-request control unit 101 uses the node conversion table 500 to check the switched access target associated with the cache node 200 determined as the hashed access target.

In S203, the access-request control unit 101 determines whether or not the access target is to be switched, by determining whether or not the hashed access target and the switched access target are different from each other.

When the access target is not to be switched (No in S203), the processing for determining a cache node 200 terminates.

In contrast, when the access target is to be switched (Yes in S203), in S204, the access-request control unit 101 switches the access target.

Figure 8:
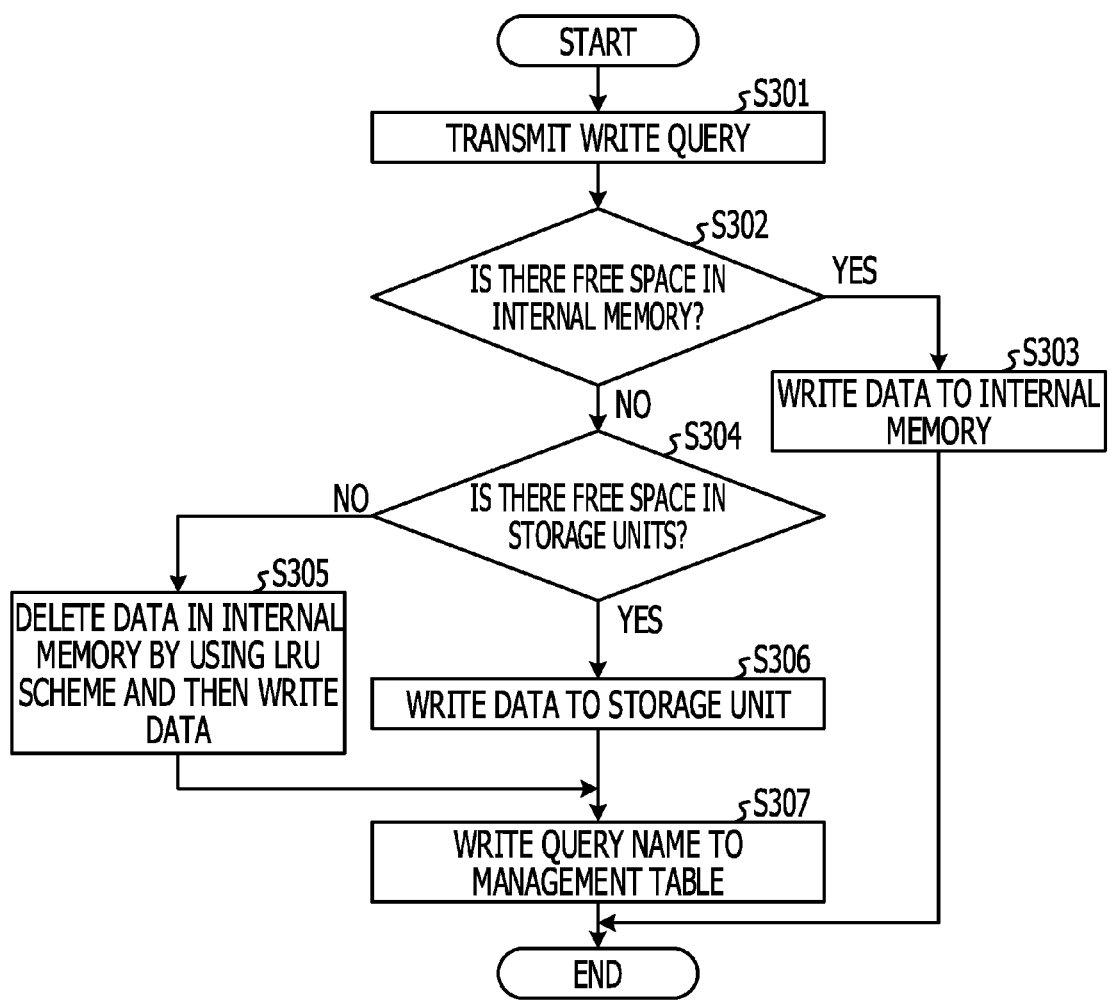
FIG. 8 is a flowchart illustrating a flow of processing performed in an information processing system according to a first embodiment in response to a write request received after a cache miss occurs.

Next, a flow of processing performed in the information processing system according to the first embodiment in response to a write request after a cache miss occurs will be described with reference to FIG. 8.

In S301, the access-request control unit 101 transmits a write query to the cache node 200.

In S302, upon receiving the write query, the cache node 200 determines whether or not there is free space in the internal memory.

When there is free space in the internal memory (Yes in S302), in S303, the cache node 200 writes data to the internal memory.

In contrast, when there is no free space in the internal memory (No in S302), in S304, the cache node 200 transmits the write query to the input/output unit 311. Upon receiving the query, the input/output unit 311 determines whether or not there is free space in the storage units 400 allocated to the cache node 200 that is the transmission source of the query.

When there is no free space in the storage units 400 (No in S304), in S305, the input/output unit 311 issues a notification to that effect to the cache node 200 that is the transmission source of the access request. The cache node 200 that has received the notification deletes data in the internal memory by using the LRU scheme. Thereafter, the cache node 200 writes data to the free space, in the internal memory, created by the data deletion.

On the other hand, when there is free space in the storage units 400 (Yes in S304), in S306, the input/output unit 311 determines an area, in the free space in the storage units 400, to which the data is to be written, and writes the data to the determined area.

Thereafter, in S307, the input/output unit 311 writes the query name of the query to the management table 600.

Figure 9:
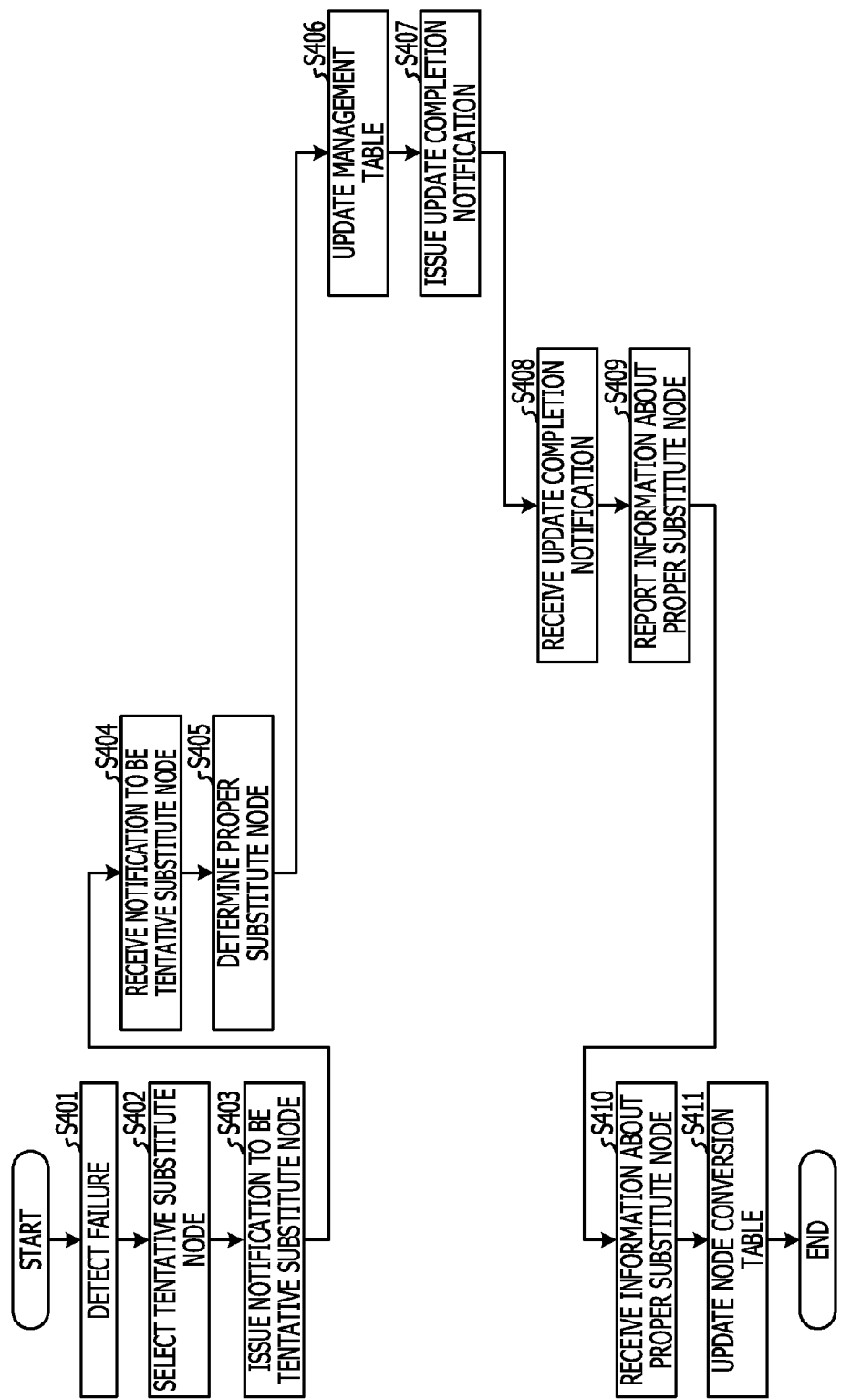
FIG. 9 is a flowchart illustrating a flow of processing for node switching in response to a failure in any of the cache nodes.

Next, a flow of processing for node switching in response to a failure in a cache node 200 will be described with reference to FIG. 9.

In S401, the failure detection unit 103 detects a failure in any of the cache nodes 200.

In S402, the access-request control unit 101 receives, from the failure detection unit 103, a notification indicating the failure in the cache node 200. The access-request control unit 101 selects a tentative substitute node.

In S403, the access-request control unit 101 issues, to the cache node 200 selected as the tentative substitute node, a notification indicating that it is selected as the tentative substitute node.

In S404, the cache node 200 selected as the tentative substitute node receives the notification indicating that it is selected as the tentative substitute node.

In S405, the cache node 200 selected as the tentative substitute node then determines a proper substitute node. Next, the cache node 200 selected as the tentative substitute node transmits information about the cache node 200 determined as the proper substitute node to the management-table management unit 312 via the input/output unit 311.

In S406, the management-table management unit 312 receives, from the cache node 200 selected as the tentative substitute node, the information about the cache node 200 determined as the proper substitute node. The management-table management unit 312 updates the management table 600 such that the storage units 400 allocated to the failed cache node 200 are to be allocated to the cache node 200 determined as the proper substitute node.

In S407, the management-table management unit 312 issues a notification (referred to as an update completion notification) indicating that the update is completed to the cache node 200 determined as the proper substitute node.

In S408, the cache node 200 determined as the proper substitute node receives the update completion notification from the management-table management unit 312.

In S409, the cache node 200 determined as the proper substitute node reports the information about the cache node 200 determined as the proper substitute node to the access-request control unit 101.

In S410, the access-request control unit 101 receives the information about the cache node 200 determined as the proper substitute node from the cache node 200 determined as the proper substitute node.

In S411, the node-conversion-table management unit 102 obtains information about the failed cache node 200 and the cache node 200 determined as the proper substitute node from the access-request control unit 101. The node-conversion-table management unit 102 updates the node conversion table 500 such that switched access target associated with the failed cache node 200 becomes the cache node 200 determined as the proper substitute node.

Figure 10:
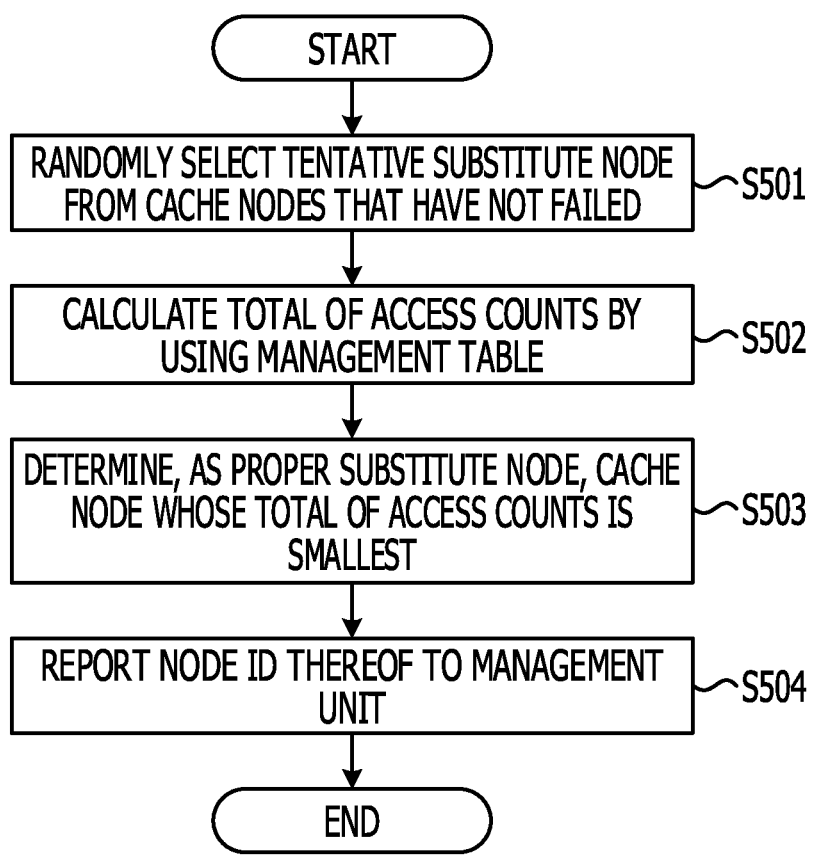
FIG. 10 is a flowchart illustrating a flow of processing for determining a substitute node.

Next, a flow of the processing for determining a substitute node will be described in more detail with reference to FIG. 10. In FIG. 10, in order to describe the processing for determining a substitute node in more detail, some processing, which is not directly relevant to determination of the substitute node, illustrated in FIG. 9 is omitted.

In S501, the access-request control unit 101 randomly selects, as a tentative substitute node, one of the cache nodes 200 that have not failed.

In S502, the cache node 200 selected as the tentative substitute node obtains the access counts of respective storage units 400 from the management table 600 held by the management-table management unit 312. The management-table management unit 312 calculates the total of the access counts of the storage units 400 allocated to respective cache nodes 200.

In S503, the cache node 200 selected as the tentative substitute node determines, as a proper substitute node, a cache node 200 whose total of the access counts is the smallest.

In S504, the cache node 200 determined as the proper substitute node by the cache node 200 selected as the tentative substitute node reports the node ID thereof, that is, the node ID of the cache node 200 determined as the proper substitute node, to the management unit 100.

Hardware Configuration

Figure 11:
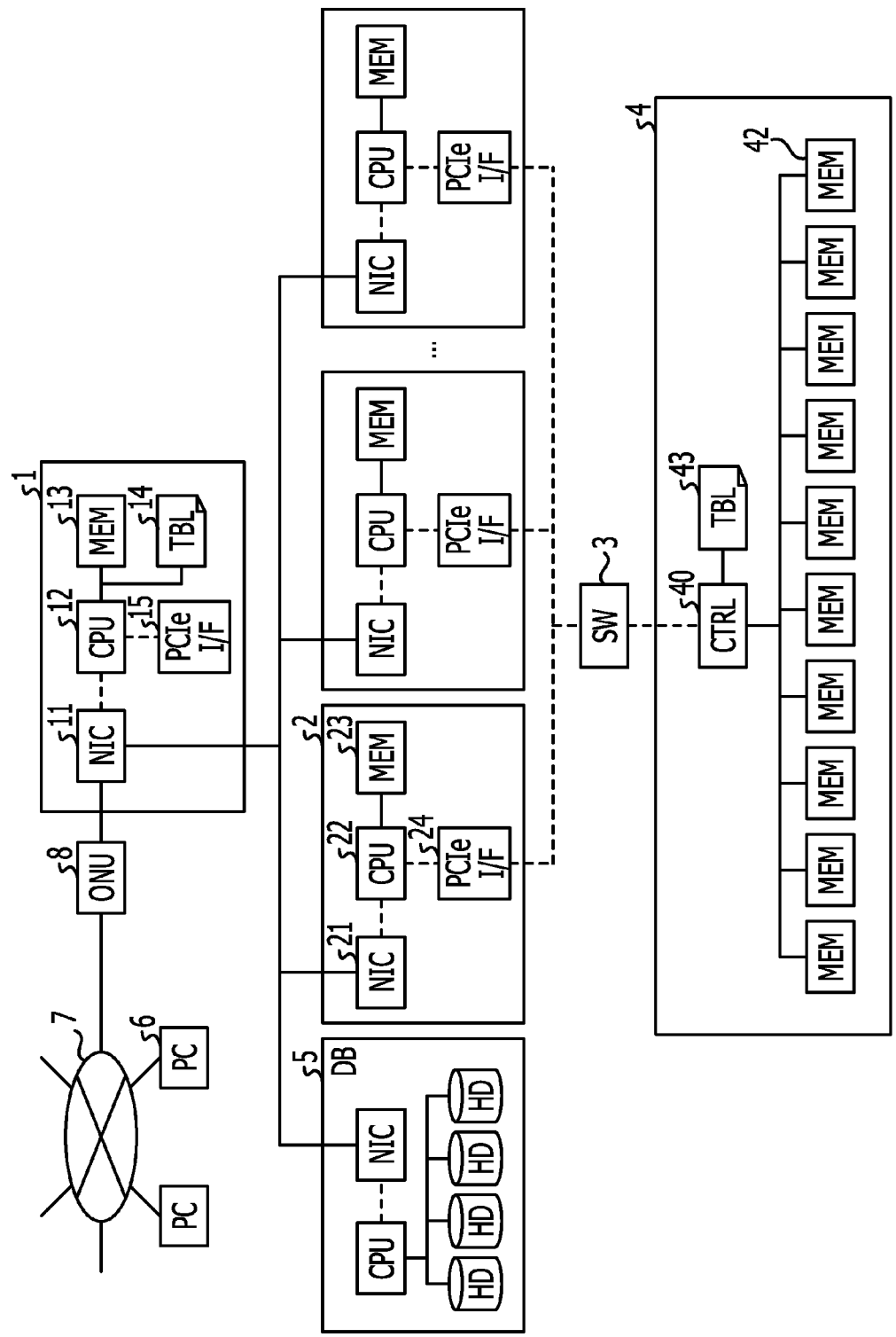
FIG. 11 is a block diagram illustrating a hardware configuration of an information processing system.

FIG. 11 is a block diagram illustrating a hardware configuration of an information processing system.

As illustrated in FIG. 11, a load balancer 1 is connected to a network 7 via an optical network unit (ONU) 8.

The load balancer 1 includes a network interface card (NIC) 11, a central processing unit (CPU) 12, a memory (MEM) 13, a table (TBL) 14, and Peripheral Component Interconnect Express interface (PCIe I/F) 15.

The table 14 corresponds to an example of a node conversion table. The CPU 12, the memory 13, and the table 14 realize the function of the node-conversion-table management unit 102 illustrated in FIG. 2.

The NIC 11 is a network interface for communicating with external devices. The CPU 12 obtains an access request from a client PC 6 via the NIC 11. The CPU 12 communicates with cache servers 2 via the NIC 11.

The NIC 11, the CPU 12, the memory 13, and the PCIe I/F 15 realize the functions of the failure detection unit 103 and the access-request control unit 101. More specifically, various programs, such as programs for realizing the processing performed by the failure detection unit 103, the access-request control unit 101, and so on, are stored in a hard disk (not illustrated) coupled to the PCIe I/F 15. For example, the CPU 12 reads those programs from the hard disk and executes the programs by loading the processes for implementing the above-described functions into the memory 13.

Each cache server 2 includes an NIC 21, a CPU 22, a memory 23, and a PCIe I/F 24.

The NIC 21 is a network interface for communicating with the load balancer 1. The CPU 22 receives a query from the load balancer 1 via the NIC 21.

The PCIe I/F 24 is an interface for communicating with an external-memory storage apparatus 4.

The NIC 21, the CPU 22, the memory 23, and the PCIe I/F 24 realize the functions of each of the cache nodes 201 to 203 illustrated in FIG. 2. More specifically, various programs, such as a program for realizing processing performed by each of the cache nodes 201 to 203, are stored in a hard disk (not illustrated) coupled to the PCIe I/F 24. For example, the CPU 22 reads those programs from the hard disk and executes the programs by loading the processes for implementing the above-described functions into the memory 23.

Dashed lines illustrated in FIG. 11 represent cables or signal lines for transmitting signals that comply with the PCI Express standard. The cables or signal lines represented by the dashed lines may be replaced with cables or signal lines for transmitting signals that comply with another standard.

A switch (SW) 3 is provided in common for the cache servers 2 in order to couple the cache servers 2 to the external-memory storage apparatus 4 through the PCI-Express-standard cables or signal lines. For example, the multi root input/output virtualization (MR-IOV) technology is used to couple the cache servers 2 and the external-memory storage apparatus 4 via the SW 3. Data output from each cache server 2 is transmitted to the external-memory storage apparatus 4, and data output from the external-memory storage apparatus 4 is transmitted to one of the cache servers 2.

The external-memory storage apparatus 4 includes a controller (CTRL) 40, a memory 42, and a management table (TBL) 43.

For example, the controller 40 is designed with a logic large-scale integration (LSI) circuit, such as an application specific integrated circuit (ASIC). The management table 43 may be provided in a memory chip such as a random access memory (RAM) or may be provided in a memory or a register inside the controller 40. The controller 40 may also be a microcontroller or CPU having a read only memory (ROM) and a RAM therein.

The management table 43 corresponds to an example of a management table. The controller 40 and the management table 43 realize the functions of the input/output unit 311 and the management-table management unit 312 illustrated in FIG. 2.

As described above, in the information processing system according to the present embodiment, the load balancer uses the node conversion table to identify the cache node in which data is stored, and the controller for the external memories uses the management table to identify the memory in which the data is stored. With this arrangement, when one cache node fails and the external memories that have been managed thereby are reallocated to another node, it is possible to access the external memories that have been managed by the failed cache node. Thus, the information processing system according to the present embodiment is capable of suppressing an increase in access to a database when the number of nodes is changed.

Second Embodiment

Figure 12:
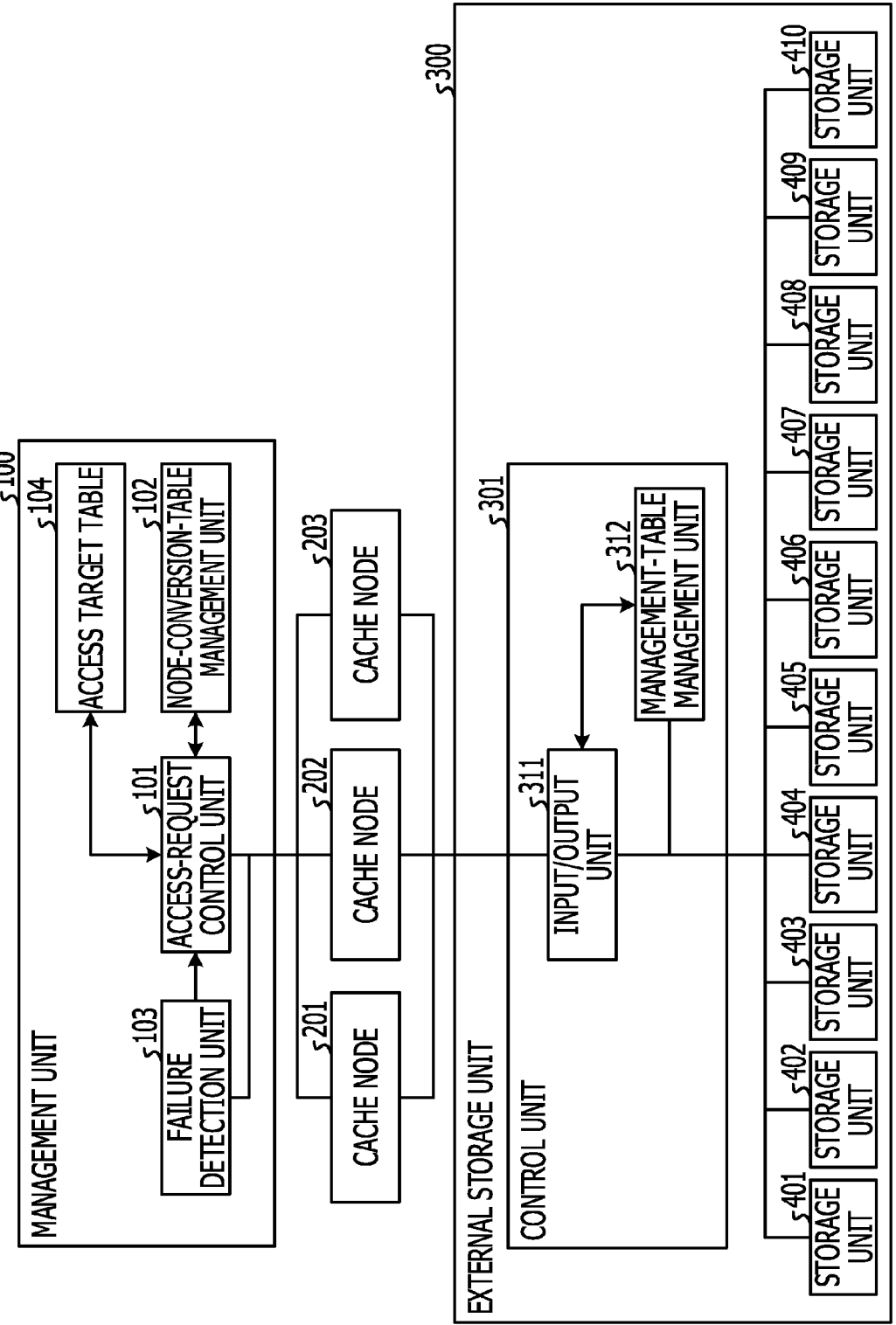
FIG. 12 is a block diagram illustrating an information processing system according to a second embodiment.

FIG. 12 is a block diagram illustrating an information processing system according to a second embodiment. The information processing system according to the second embodiment has an access target table, which is a different point from the first embodiment. Thus, a description will mainly be given of the function of a management unit 100 that uses the access target table. It is to be noted that, in FIG. 12, elements having the same reference numerals as those in FIG. 1 have substantially the same functions, unless otherwise particularly stated.

The information processing system according to the present embodiment has an access target table 104 in addition to the information processing system according to the first embodiment.

In the access target table 104, identification information of a cache node 200 that is an access target is registered in association with a query key.

Upon receiving an access request, the access-request control unit 101 refers to the access target table 104 to determine whether or not there is any cache node 200 associated with the query key included in the received access request. When there is any cache node 200 associated with the query key, the access-request control unit 101 sets the cache node 200 as a hashed access target. On the other hand, when there is no cache node 200 associated with the query key, the access-request control unit 101 calculates a value, for example, by applying a hash function to the key and identifies the cache node 200 to be the hashed access target.

In addition, when new data is stored in the storage unit 400, the access-request control unit 101 registers, in the access target table 104, a query key for the newly stored data in association with information about the cache node 200 corresponding to the query key.

Thereafter, the access-request control unit 101 obtains a switched access target associated with the hashed access target and transmits a query to the obtained switched access target, as in the first embodiment.

Now, consider a case in which a cache node 200 to which storage units 400 in which data is stored are allocated is switched upon occurrence of a failure. In the present embodiment, the use of the access target table 104 allows an access target to be directly identified based on a query. Accordingly, the access-request control unit 101 may change, in the access target table 104, the access target corresponding to a query for requesting data stored in the storage unit 400 whose allocation has been changed. With such an arrangement, with respect to queries registered in the access target table 104, the access-request control unit 101 may more quickly determine the access target without referring to the node conversion table 500.

As described above, by using the access target table, the information processing system according to the present embodiment may determine a cache node that serves as an access target for a received access request. This allows the information processing system to easily identify the access target that is the transmission destination of a query, without performing calculation using a hash function or the like. That is, it is possible to reduce the processing load in the information processing system.

While a scheme for dealing with data stored in the internal memory has not been described above, the data may be handled as described below.

For example, each cache node 200 periodically writes out data, stored in the internal memory, to the storage units 400 to create a backup. As a result, the data stored in the internal memory is also stored in the storage units 400. Thus, even when one cache node 200 fails, the management unit 100 may access the data stored in the internal memory in the failed cache node 200.

Also, for example, the information processing system may be realized without using the internal memory in the cache node 200.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. An information processing system comprising:
plural information processing apparatuses;
plural storage devices each allocated to one of the plural information processing apparatuses;
a load-balancing control device configured to receive an access request, determine, based on the received access request, one of the plural information processing apparatuses as an access target to which an instruction for performing processing is to be issued by calculating a value, the value being calculated by determining a hash value by applying a hash function to a query in the received access request and dividing the hash value by the plural information processing apparatuses, and issue the instruction for performing processing to the one of the plural information processing apparatuses; and an allocation control device configured to reallocate, when a failure occurs in a first apparatus of the plural information processing apparatuses, first storage devices to a proper substitute apparatus among the plural information processing apparatuses, the first storage devices having been allocated to the first apparatus, the proper substitute apparatus being different from the first apparatus, wherein the load-balancing control device has a conversion table in which the first apparatus is registered in association with the proper substitute apparatus, and the load-balancing control device is configured to refer to the conversion table to determine, based on the calculated value, the proper substitute apparatus associated with the access target, and issue the instruction to the proper substitute apparatus.

2. The information processing system according to claim 1, wherein the allocation control device has a management table in which each of the plural storage devices is registered in association with an information processing apparatus to which each of the plural storage devices is allocated, and the allocation control device is configured to reallocate the first storage devices by registering, in the management table, the first storage devices in association with the proper substitute apparatus, refer, upon receiving the instruction from a second apparatus of the plural information processing apparatuses, to the management table to identify storage devices allocated to the second apparatus, and determine whether data corresponding to the access request is stored in the identified storage devices.

3. The information processing system according to claim 1, wherein the allocation control device has a management table in which each of the plural storage devices is registered in association with an information processing apparatus to which each of the plural storage devices is allocated, the load-balancing control device is configured to detect the failure that has occurred in the first apparatus, and select a tentative substitute apparatus from among the plural information processing apparatuses, the tentative substitute apparatus being different from the first apparatus, the tentative substitute apparatus is configured to determine the proper substitute apparatus upon receiving a notification of the selection from the load-balancing control device, and transmit information about the proper substitute apparatus to the allocation control device, the proper substitute apparatus is configured to report, upon receiving a notification indicating completion of the reallocation from the allocation control device, the information about the proper substitute apparatus to the load-balancing control device, and the load-balancing control device is configured to update the conversion table upon receiving the information about the proper substitute apparatus.

4. The information processing system according to claim 3, wherein the management table stores therein access counts of the respective plural storage devices, the access counts indicating numbers of accesses to the respective plural storage devices in a certain period of time, and the tentative substitute apparatus is configured to calculate, based on the access counts retrieved from the allocation control device, a total access count for each information processing apparatus other than the first apparatus, the total access count being a total of the access counts of storage units allocated to each information processing apparatus, and determine, as the proper substitute apparatus, an information processing apparatus whose total access count is smallest.

5. A method for controlling an information processing system, the method comprising:

receiving an access request by a load-balancing control device;

determining, by the load-balancing control device and based on the received access request, one of plural information processing apparatuses as an access target to which an instruction for performing processing is to be issued by calculating a value, the value being calculated by determining a hash value by applying a hash function to a query in the received access request and dividing the hash value by the plural information processing apparatuses;

issuing, by the load-balancing control device, the instruction for performing processing to the one of plural information processing apparatuses;

reallocating by an allocation control device, when a failure occurs in a first apparatus of the plural information processing apparatuses, first storage devices among plural storage devices to a proper substitute apparatus among the plural information processing apparatuses, the first storage devices having been allocated to the first apparatus, the proper substitute apparatus being different from the first apparatus;

referring to a conversion table of the load-balancing device in which the first apparatus is registered in association with the proper substitute apparatus to determine, based on the calculated value, the proper substitute apparatus associated with the access target; and issuing the instruction to the proper substitute apparatus.

6. A non-transitory computer-readable recording medium storing a program that causes a computer to execute a procedure for controlling an information processing system, the procedure comprising:

receiving an access request;

determining, based on the received access request, one of plural information processing apparatuses as an access target to which an instruction for performing processing is to be issued by calculating a value, the value being calculated by determining a hash value by applying a hash function to a query in the received access request and dividing the hash value by the plural information processing apparatuses;

issuing the instruction for performing processing to the one of plural information processing apparatuses;

reallocating, when a failure occurs in a first apparatus of the plural information processing apparatuses, first storage devices among plural storage devices to a proper substitute apparatus among the plural information processing apparatuses, the first storage devices having been allocated to the first apparatus, the proper substitute apparatus being different from the first apparatus;

referring to a conversion table in which the first apparatus is registered in association with the proper substitute apparatus to determine, based on the calculated value, the proper substitute apparatus associated with the access target; and issuing the instruction to the proper substitute apparatus.

* * * * *